DECIMAL POINT LOCATOR

Filed Feb. 9, 1952 3 Sheets-Sheet 1

WILLIAM H. BURKHART
INVENTORS: HOWARD M. FLEMING, JR.
FREDERICK W. PFLEGER
BY William L. Glover
AGENT

INVENTORS: WILLIAM H. BURKHART
HOWARD M. FLEMING, JR.
FREDERICK W. PFLEGER

BY William S. Glover
AGENT

Nov. 6, 1956 W. H. BURKHART ET AL 2,769,592

DECIMAL POINT LOCATOR

Filed Feb. 9, 1952 3 Sheets-Sheet 3

INVENTORS: WILLIAM H. BURKHART
HOWARD M. FLEMING, JR.
FREDERICK W. PFLEGER

BY William L. Glover

AGENT

United States Patent Office 2,769,592

Patented Nov. 6, 1956

2,769,592

DECIMAL POINT LOCATOR

William H. Burkhart, East Orange, Howard M. Fleming, Jr., Basking Ridge, and Frederick W. Pfleger, Paulinskill Lake, Newton, N. J., assignors to Monroe Calculating Machine Company, Orange, N. J., a corporation of Delaware

Application February 9 1952, Serial No. 270,876

29 Claims. (Cl. 235—61)

This invention relates to decimal point aligning means for use in electronic computers and the like.

An electronic computer to which the means of this invention is particularly well adapted includes a ten-key keyboard, or a tape reader which is the equivalent thereof, an intermediate storage device to which digital signals are transmitted in response to keyboard or equivalent operations, one digit signal at a time, and a general storage device to which whole numbers assembled in the intermediate storage device are shifted. The intermediate storage device is adapted to receive each digit signal from the keyboard at the same time of cycle and to shift said signal to another time of cycle prior to the reception of another digit signal. With this arrangement the keyboard (or tape reader) may be operated at any desired speed while the intermediate storage device operates at a fixed speed which is synchronized with that of the general storage device.

In both the intermediate and the general storage device the time location of each digit identifies the units, tens, hundreds, etc. value thereof. Obviously, if all digits are entered in the intermediate storage device at the same time of cycle and are shifted a fixed amount between successive digit entries, the decimal points of numbers containing variable numbers of digits will be located at various time positions when the complete number is assembled in the intermediate storage device. However, if numbers were shifted to the general storage device with their decimal points in various time positions, erroneous results would be obtained when the same were withdrawn from the general storage device for use in calculations.

The general object of the invention, therefore, is the provision of means for aligning the decimal points of numbers transmitted, digit by digit, to the intermediate storage device of a computer or the like.

For convenience of description, the digits to the right of the decimal point of a number will hereinafter be referred to as decimal digits.

The invention contemplates the use of a counter which may be advanced one step for each digit entered into the intermediate storage device, means for resetting the counter to its initial condition between the entries of the lowest order whole digit and the highest order decimal digit, and key operated means for advancing the counter to a fixed count from whatever count it has attained in response to the entry of decimal digits, each such advance of the counter shifting the digits in the intermediate storage device the same amount as the entry of a further digit would. The means for resetting the digit counter to its initial condition on the occurrence of the decimal point in each number includes a decimal key which is operable at the appropriate time, and an automatic decimal selection switch which may be preset to operate after a desired number of digits have been entered into the intermediate storage device. This automatic switch finds great utility in problems which involve the entering into the intermediate storage device of a long series of numbers each having the same number of digits to the left of the decimal point. Control means are also provided to prevent conflict between the decimal key and the automatic decimal selection switch. A simplified form of the invention does not include the automatic decimal selection switch, which necessitates advancing the digit counter in response to the entry of the digits to the left of a decimal point. In this arrangement the counter is normally blocked from advancing and is unblocked on an operation of the decimal key.

Other objects and features of the invention will become apparent in the following description when read in the light of the drawings of which:

In order to facilitate an understanding of the invention, the drawings have been simplified by the substitution of block symbols for certain components that are used repetitively, and Figs. 4 through 7 have been added to illustrate what the block symbols represent.

Figure 4:
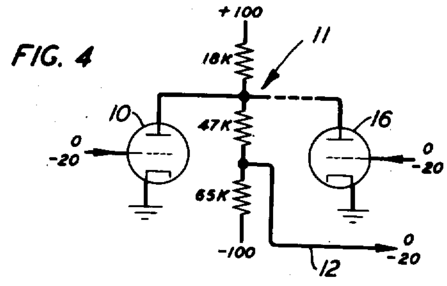
Figs. 4 through 7 are detailed wiring diagrams of certain components shown symbolically in the other figures.

Referring to Fig. 4 there is illustrated an electronic inverter which in the other figures is represented by an encircled I. As shown, the inverter consists of a triode 10 of suitable type having its cathode grounded and its anode applied to the juncture of the two positivemost sections of a three-section voltage divider 11. Said voltage divider is connected across sources of +100 and −100 volt potentials and has an output line 12 projected from the center tap thereof. Utilizing the resistor values indicated in the drawings, the application of a 0 volt potential to the grid of the triode to effect conduction of the latter causes output line 12 to assume a potential of approximately −20 volts. Application of a −20 volt potential to the grid of the triode, however, cuts off the latter and the potential of output line 12 rises to approximately 0 volts. In the present embodiment of the invention, potentials of 0 volts and −20 volts are used throughout and, for convenience, will hereinafter be referred to as "high" and "low" respectively.

Figure 6:
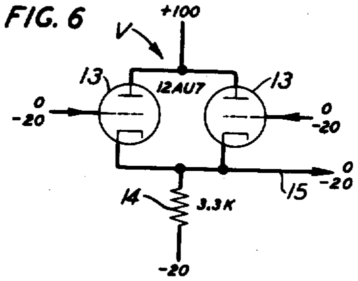

Referring now to Fig. 6, there is disclosed an "or gate" which in the other figures is represented by an encircled V. As shown, the "or gate" consists of a pair of triodes 13 having their anodes commonly connected to a source of positive potentials and their cathodes commonly connected through a resistor 14 to a source of negative potential, say −20 volts. An output line 15 is projected from the connected cathodes. Application of a low potential (−20 volts) to the grids of both triodes maintains both in cutoff condition and output line 15 assumes a potential of −20 volts. However, if a high potential (0 volts) is applied to the grid of either triode, the potential of output line 15 is raised by cathode follower action to approximately 0 volts. Obviously, any number of triodes may be connected with a common resistor 14 and output line 15.

Referring again to Fig. 4, another type of "or gate," hereinafter called a plate connected type "or gate," may be formed by connecting the anode of another triode 16 to the voltage divider for triode 10. In this form of "or gate," application of a high potential to the grid of either tube produces a low output potential on line 12. In the other figures of drawing, the plate connected "or gate" is indicated by an encircled $V_P$.

Figure 5:
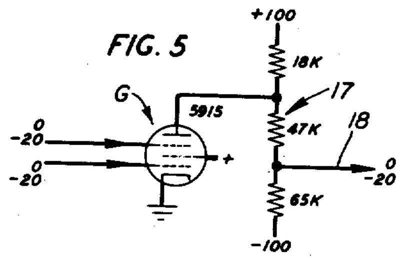

Referring to Fig. 5, there is illustrated a coincidence gate which in the other figures is represented by an encircled G. As shown, the coincidence gate consists of a pentode of suitable type having its anode connected to a three-section voltage divider 17 of the sort described above, and its cathode connected to ground. As before, an output line 18 is projected from the center tap of the voltage divider. The screen grid of the pentode is connected to a source of positive potential in the normal manner. The control and suppressor grids of the pentode, however, are connected to signal sources which assume the high and low potential levels of 0 and −20 volts. The simultaneous application of high potentials to both grids of the pentode effects conduction thereof and output line 18 assumes a low potential (−20 volts). Application of a low potential to either or both grid of the pentode effects cutoff of the latter output line 18 assumes a high potential (0 volts).

Referring again to Fig. 4, the plate connected type "or gate" illustrated therein also is utilizable as a coincidence gate because of the fact that a high output is produced on line 12 only when low potentials are simultaneously applied to the grids of both triodes. Hereinafter this type coincidence gate will be called a "plate connected" coincidence gate and will be represented by an encircled $G_P$.

Figure 7:
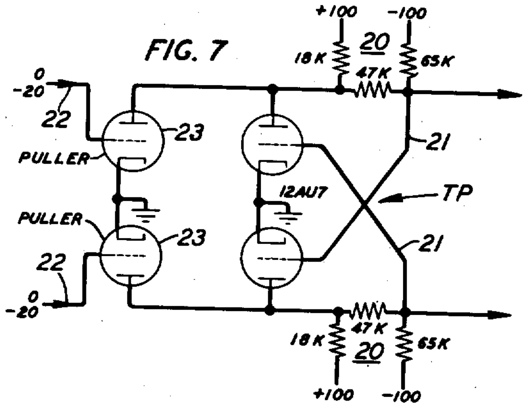

Referring now to Fig. 7, there is illustrated a bi-stable flip-flop which in the other figures is represented by a pair of circles and the letters TP and which will hereinafter be referred to as a flip-flop. As shown, the flip-flop consists merely of two inverters 20 of the type shown in Fig. 4, with the output 21 of each applied to the grid of the other. Input lines 22 are provided to the grids of puller tubes, plate to plate connected each with one of the flip-flop triodes. Puller triodes 23 are illustrated in Fig. 7 to indicate the connection thereof with the flip-flop. Conduction of one of the flip-flop triodes maintains the other triode non-conductive by reason of the low potential (−20 volts) on the output line 21 of the conducting tube. Application of a high potential (0 volts) on the input line 22 of the puller for the non-conducting tube effects conduction of the former and lowers the potential at its anode and, therefore, the potential of the output line of the non-conducting flip-flop tube, to the point where the conducting flip-flop tube is cut off, and the conductive states of the tubes reverse. Application of a low potential (−20 volts) to one of the input lines 22 is ineffective in so far as changing the state of the flip-flop is concerned.

It is to be understood, of course, that the circuits described above are merely by way of example and are readily replaceable by other circuits which accomplish the same results. For example, the flip-flops, as used in the means of the invention, may be replaced by any bi-stable devices such as lockup relays so that the term flip-flop must be understood as including the same.

Before entering into a detailed description of the means of the invention, it is deemed desirable, first, to describe the environment and the general organization of said means as well as the modes of operation thereof.

Figures 1, 2:
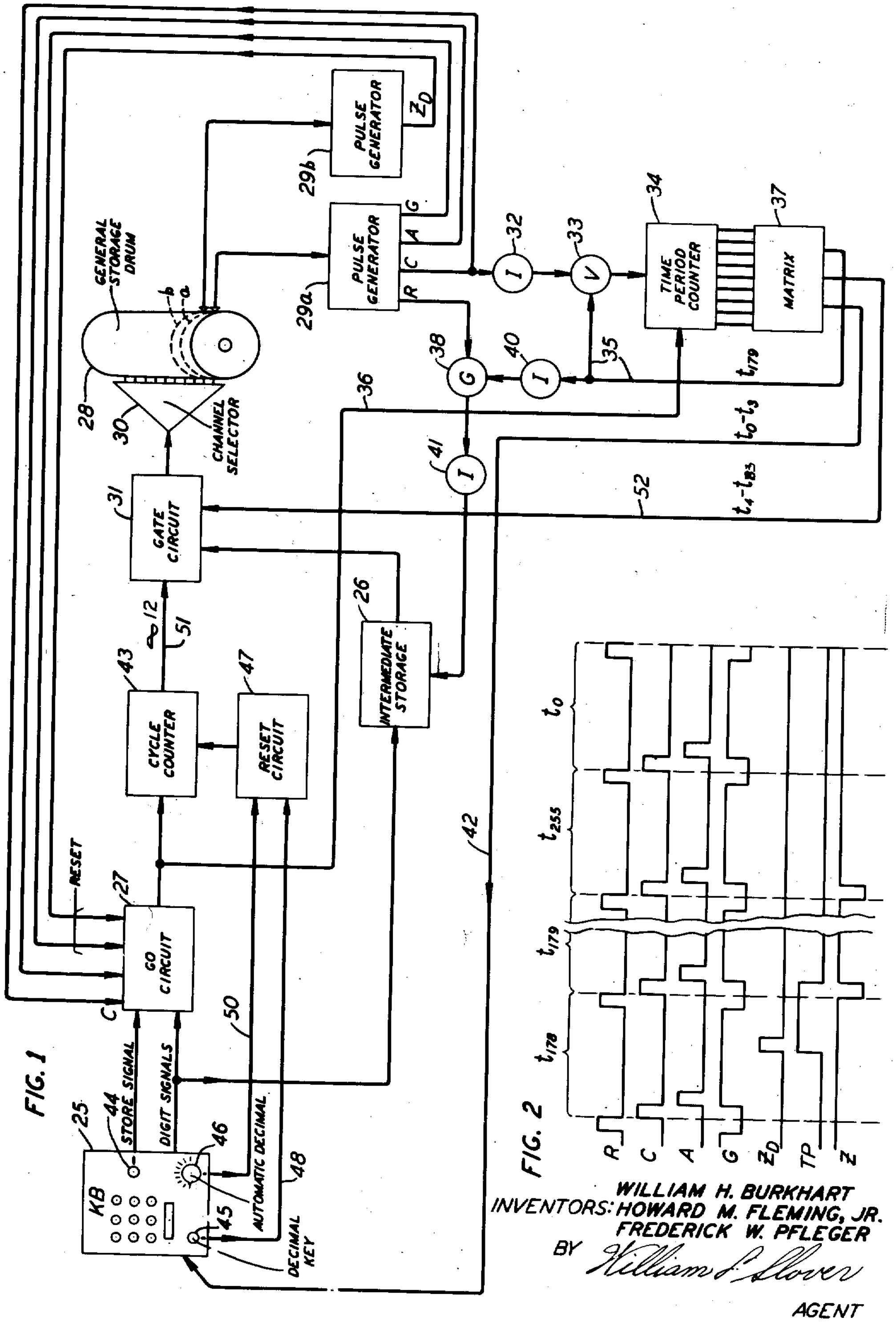
Fig. 1 is a block diagram of the means of the invention but shows certain features in detail.
Fig. 2 is a pulse diagram which illustrates the relative timing of certain operating pulses used by the means of the invention.

Referring to Fig. 1, manipulation of a ten-key keyboard 25 transmits appropriate coded decimal (1, 2, 4, 8) pulse signals to a storage device 26 and also, for each key depression, initiates a timed operation of a Go circuit 27. In the present instance, storage device 26 is an intermediate storage device, but the invention is not limited to use with such. Storage device 26 may be of any type adapted to receive a digital signal only during a definite period of a cycle and to shift the stored signal prior to reception of the next digit signal in order to make room for the latter. Obviously, a gated shift register may be utilized, but it is preferred to make use of a precessing magnetic storage arrangement of one of the types disclosed in the copending applications of William H. Burkhart, Serial No. 228,148, filed May 25, 1951, now Patent No. 2,739,299; of Walter S. Oliwa and Howard M. Fleming, Jr., Serial No. 255,644, filed November 9, 1951; and of Howard M. Fleming, Jr., Serial No. 255,643, also filed November 9, 1951. That shown in the last-mentioned application is particularly preferred. This particularly preferred precessing arrangement comprises a rotating disc adapted to have up to one hundred eighty spot magnetizations impressed on its periphery during a single active cycle thereof, such magnetizations occurring during successive time periods of disc cycle. By "active cycle" is meant a disc revolution on which new information is to be recorded on the disc, or previously recorded information precessed to a new position, or one on which recorded information is to be read from the disc. Other disc revolutions may conveniently be thought of as idle cycles.

Each active disc cycle is divided into 180 time periods which are equivalent each to two degrees of disc rotation. The first time period, which begins at zero degrees of disc rotation, is designated $t_0$, the second, $t_1$, etc. In the present instance, the one hundred eightieth time period of each cycle is designated $t_{179}$ when the next revolution of the disc is to be an idle cycle but is designated $t_{255}$ when the next revolution is to be an active cycle. The purpose of this arrangement will become apparent hereinafter.

In order to differentiate between binary one and binary zero, the magnetized spots are provided with opposite polarities. Further, the recording means is arranged to magnetize "zero spots" in the absence of signals indicative of binary one. The recording and playback means for the disc are interconnected for the latter to operate the former and are spaced apart relative to the periphery of the disc, a distance which provides a delay of, say, ninety-two time periods between the recording and the playback of a spot. Thus, a digital signal recorded during time periods $t_0$ to $t_3$ of an active cycle is re-recorded during time periods $t_{92}$ to $t_{95}$ of that cycle, and then again during time periods $t_4$ to $t_7$ of the next active cycle, which may be one during which the record means is actuated to record another digit during time periods $t_0$ to $t_3$. In order to precess recorded digits only four time periods between successive active cycles as, for example, between the initial recordings of successive digits, the recording means includes a coincidence gate or the like which passes digital signals only on simultaneous application thereto of recording pulses, which are provided only on active cycles, one during each time period.

In the present instance, when all of the digits of a number have been recorded in intermediate storage device 26, the entire number is shifted to a selected channel of a magnetic drum 28 which is driven synchronously with the disc, as by a common drive shaft. The channel selection is accomplished by a selector circuit 30 which may be a relay pyramid. A gate circuit 31 located between the intermediate storage device 26 and drum 28 serves to prevent shifting of incomplete numbers from the former to the latter.

In order to time the opening of gate circuit 31 accurately, and for other reasons to become apparent hereinafter, a pair of timing tracks *a* and *b* are provided on drum 28, the former having a full complement of one hundred eighty spots recorded therein and the latter having a single spot recorded therein. The playback means for tracks *a* and *b* actuate pulse generators 29a and 29b, respectively, of which the former produces pulse trains R, C, A and G, and the latter produces pulse train $Z_D$ (see Fig. 2). Both generators may include any known means for producing rectangular pulses such as R and $Z_D$, and generator 29a also includes suitable means such as multivibrators for producing the delayed pulses C and A as well as inversion means for inverting the R and C pulses to form the G pulses. To this last end, the R and C pulses may be applied to the grids of a plate connected type "or gate" of the sort described hereinabove.

The C pulses from pulse generator 29a are transmitted to Go circuit 27 to control the time of operation of the latter, and also, through an inverter 32 and an "or gate" 33, to a time period counter 34 advanced one count by each negative pulse from the inverter. Counter 34 may be a binary counter of any known sort adapted to count through two hundred fifty-six steps (including zero) to a state indicative of 255, but having an output from the appropriate stage thereof connected back to "or gate" 33 by line 35 to disable the same when it has been advanced one hundred eighty steps (including zero) and stands at 179. This count is completed during the last time period of each active cycle, but the counter stands at 179 only if the next cycle is to be an idle cycle. If the next cycle is to be an active cycle, the counter, rather than advancing to 179, is jumped directly to 255 by means to be described hereinafter and wire 35 from the stage appropriate to the former number (179) is ineffective to disable the counter. When the counter is disabled the same stands at 179 and wire 35 maintains it disabled. It is believed evident, therefore, that the designation of the last time period of an active cycle as $t_{179}$ or $t_{255}$ depends on which state (179 or 255) counter 34 assumes during that time period, and that this, in turn, is dependent on whether the next cycle is to be an active or an idle cycle.

In order to enable counter 34 for a cycle of operation after it has been disabled, each stage thereof is connected to an output 36 of Go circuit 27, which, at the proper time to initiate an active cycle, for example, following a digit key operation, operates to transmit a pulse over said line to advance the counter to 255 in one step. Obviously, following this, the inverted C pulses are effective to advance the counter step by step. This means is also used to jump the counter from 178 to 255 when it is not desired to disable the same at the end of an active cycle.

The several stages of counter 34 are connected to a matrix 37 adapted to reflect, on output lines thereof, the state of any one or any group of said stages. The matrix may be of any suitable sort such as, for example, a crystal rectifier network. Obviously, the output lines of matrix 37, while indicating the states of the several stages of counter 34, also indicate the time period or periods in which said stages assume said states, and are usable to time the operations of the computer. For example, the line 35, which is used to disable counter 34 when the same assumes a state indicative of 179 during time period $t_{179}$, is an output from matrix 37 that assumes a high potential only at that time.

In order to provide intermediate storage device 26 with record pulses R for one complete cycle following each digit key depression, the R pulses from generator 29a are applied to a coincidence gate 38 to which a branch of line 35 is also connected through an inverter 40. Obviously, gate 38 produces a low output during time periods $t_0$ to $t_{178}$ of all active cycles and also during time period $t_{255}$ of those active cycles immediately followed by another active cycle. At all other times gate 38 has a high output, it being remembered that counter 34 becomes disabled during time period $t_{179}$ of active cycles which are followed by idle cycles, and maintains line 35 at a high potential until it is re-enabled. The output of gate 38 is applied to an inverter 41 which delivers the gated R pulses to intermediate storage device 26 and the latter functions in the manner set forth above.

The A and G pulses from generator 29a and also the $Z_D$ pulses from generator 29b are applied to Go circuit 27 to time the operations thereof in a manner to be set forth in detail hereinafter.

Keyboard 25 includes code forming means to be described hereinafter, which are enabled for operation only during time periods $t_0$ to $t_3$ of each cycle initiated by Go circuit 27 in response to a key depression. This is accomplished by connecting the appropriate outputs of matrix 37 to said means as indicated by line 42 in Fig. 1. Thus each digit to be stored is initially recorded in intermediate storage device 26 during said time periods $t_0$ to $t_3$. The final time location of each digit in the intermediate storage device is, of course, dependent on the amount each digit is precessed following its initial recording. In the instant embodiment of the invention, the computer can handle numbers containing ten digits on either side of a decimal point which results in that a twenty digit number, prior to being shifted to drum 28, occupies time locations $t_0$—$t_{79}$ and also $t_{92}$—$t_{171}$ in intermediate storage device 26, it being remembered that the playback of information recorded during the first half of a cycle effects re-recording of said information 92 times periods later during the latter half of the cycle. In order to facilitate an understanding of the timing, this re-recording during the last half of the cycle will not be referred to hereinafter except when necessary. It will be understood, of course, that the invention is applicable to any means requiring any fixed decimal point location and is not limited to the instant embodiment thereof.

Obviously, all numbers to be entered into the computer for use in a particular computation will not contain twenty digits of which ten are on either side of a decimal point but rather, will contain any number of digits up to twenty with the decimal points located between any two of the eleven highest order digits of each. Therefore, means are provided to precess each number to the time position it would assume if it had ten decimal digits, which action actually increases the number of digits of each number to twenty by the addition of zeros to either end thereof, it being remembered that zeros are recorded in the absence of signals indicating other digits. For example, the four decimal digit number 62.7421 would be recorded during time periods $t_0, t_1, \ldots, t_{23}$ on entry of the last decimal digit "1," but by precessing the number six digit recording times, the same is recorded during time periods $t_{24}, t_{25}, \ldots, t_{47}$ and zeros are recorded during time periods $t_0, t_1, \ldots, t_{23}$ and $t_{48}, t_{49}, \ldots, t_{79}$. Obviously, the decimal point of this number is then located correctly.

The means to the above ends include a cycle counter 43 adapted to be advanced one count for each actuation of Go circuit 27 in response to a digit key depression, a Store key 44, a Decimal key 45, a Decimal Selector switch 46, and a reset circuit 47 for the counter. Counter 43 may be of any suitable sort having appropriate capacity. As indicated by lines 48 and 50 (Fig. 1), Decimal key 45 and Decimal Selector switch 46 are connected with reset circuit 47 to operate the latter and reset counter 43 to its initial one count, regardless of what count it has reached. Store key 44 is connected to Go circuit 27 to actuate the latter repeatedly and thus to advance counter 43 to a predetermined count and back to its initial one count.

The operation of entering a number into the computer proceeds as follows:

The digit keys of keyboard 25 are manipulated to enter the digits to the left of the decimal point of the number, after which, the Decimal key 45 is operated. Each digit key depression precesses previously recorded digits and advances counter 43 one count; and the decimal key depression resets the counter to one. Obviously, if ten digit keys are depressed, the counter stands at eleven before being reset by the Decimal key. For reasons to become apparent presently, however, the said predetermined count of the counter is not eleven but twelve.

Following an operation of the Decimal key, the digits to the right of the decimal are entered through the keyboard, and then the Store key 44 is operated. The Store key effects repeated operations of Go circuit 27 to advance counter 43 to said predetermined count (12) and back to one, and precesses the recorded digits to the time positions they would be in if the number contained ten digits to the right of the decimal point. An output 51 from the stage of counter 43 appropriate to a count of twelve is applied to gate circuit 31 along with an output 52 of matrix 37 appropriate to time periods $t_4$—$t_{83}$, said outputs combining to open said gate circuit at the stated time, namely, time periods $t_4$—$t_{83}$ of cycle 12. This, of course, permits the number recorded in intermediate storage device 26 during time periods $t_0$—$t_{79}$ and also during time periods $t_{92}$—$t_{171}$ of one cycle to be shifted to drum 28 during time periods $t_4$—$t_{83}$ of the next cycle, it being remembered that a 92 time period delay is encountered between recording time and playback time. Gate circuit 31 may be of any suitable sort such, for example, as a pair of coincidence gates connected by an inverter.

It will readily be seen that the resetting of counter 43 subsequent to the recording of the digits to the left of the decimal point of a number, followed by the advancing of the counter to capacity (Store key) regardless of the number of digits to the right of the decimal point, accurately time positions the complete number in the intermediate storage device.

Obviously, therefore, Store key 44 and the means controlled thereby have two functions of which one is to effect transfer of a number from intermediate to general storage and the other is to effect correct positioning of the decimal point of a number in a fixed decimal point position in the intermediate storage device. This latter function is the one with which the invention is most concerned and said key and associated means may conveniently be referred to hereinafter as the decimal locating means.

In order to eliminate the need for Decimal key 45 in those instances wherein a long series of numbers having the same number of digits to the left of the decimal point are to be entered into the computer, the Decimal Selector switch 46 is connected to counter 43 to reset the latter automatically after the appropriate number of digits have been recorded.

It is to be mentioned that it is the use of an automatic Decimal Selector switch, which operates after a predetermined number of digits have been entered through the keyboard, that, in the present instance, necessitates the counting of the digits to the left of the decimal point as well as the decimal digits by the cycle counter. If such a switch is not utilized, it is only necessary to count the digits on one side of the decimal point in order to position a number correctly. A simplified embodiment of the invention which operates in this manner will be described hereinafter.

The details of the means of the invention will now be described.

*The keyboard*

Figure 3:
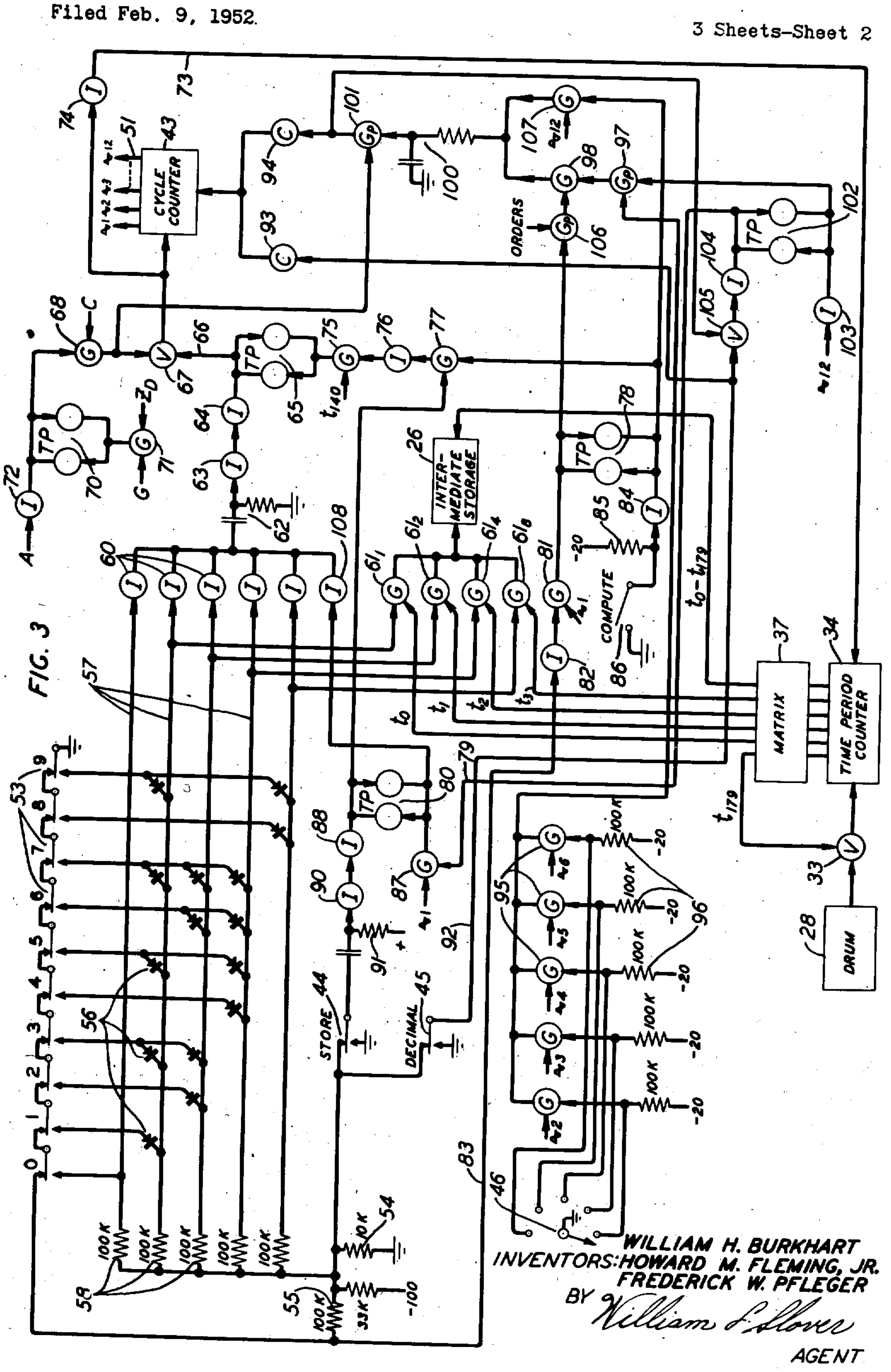
Fig. 3 is a detailed wiring diagram of the means of the invention but illustrates certain features in block form.

Keyboard 25 may be of any suitable sort adapted to transmit to a computer the electrical coded decimal signals appropriate to each digit key depression. As shown in Fig. 3, each digit key controls a switch blade 53 normally engaged with a rear contact but movable by the key to engage a front contact. The rear contacts and the blades of the several switches form a series path between ground and a voltage divider 54 which consists of a pair of resistors, one connected to ground and the other to a source of negative potential, say −100 volts. The resistors may conveniently have the values shown in the drawings. A large resistance 55, which may have the value shown, is connected between the voltage divider and the series path through the switches. The front contact of each switch is connected through one or more diodes 56 to a line or lines 57 indicative, in coded decimal notation, of the digit represented by the switch. Each line 57 is connected through a large resistor 58 of substantially the same value as that of resistor 55 to the voltage divider 54. Depression of any digit key will operate the associated switch 53 and current will flow from ground through the associated diode or diodes 56 to the voltage divider 54. This raises the potential of the appropriate line or lines 57 to substantially ground potential, said lines, prior to such key depression, being at the negative potential of the voltage divider tap (approximately −20 volts).

Each line 57 is applied to an inverter 60 and also to one grid of a coincidence gate 61. For convenience, the coincidence gates 61 are provided with the subscripts 1, 2, 4 and 8 to indicate their coded decimal values. It is to be noted that a zero switch 53 as well as a zero inverter 60 is provided. However, no zero gate 61 is provided. The reason for this becomes apparent when it is realized that the magnetic storage system of the computer automatically stores the digit zero in the absence of any other digit signal, but, that it is necessary to precess previously recorded digits when a significant zero is entered through the keyboard.

The coding gates 61 have a common output which is applied to the intermediate storage device 26. Preferably, said application is made through an inverter (not shown) which delivers a high potential for each operation of each gate. As described above, the code designation for each digit is to be delivered to the intermediate storage device during time periods $t_0$—$t_3$ of cycle. To this end, the second input to each gate is derived from matrix 37, and assumes a high potential during the appropriate time period $t_0$, $t_1$, $t_2$ or $t_3$.

Therefore, the gates 61 are primed selectively in response to key depression, and the selected gates are operated during the appropriate time periods. For example, if the "7" key is depressed, gates $61_1$, $61_2$ and $61_4$ are primed and are operated during time periods $t_0$, $t_1$ and $t_2$ respectively.

*The Go circuit*

The inverters 60 (Fig. 3) control Go circuit 27 (Fig. 1). To this end, the outputs thereof are commonly connected to a differentiator circuit 62 (Fig. 3) whose output is in turn applied to another inverter 63. Conduction of one or more inverters 60, in response to a digit key depression, lowers the potential at their common output, and a sharp, negatively directed pulse is applied to inverter 63. No matter how long a key is held depressed, the differentiator 62 applies only this one effective pulse to said inverter 63. The output of inverter 63 is applied to a second inverter 64 that is utilized as a puller to set a flip-flop 65 which is the basic element of Go circuit 27. When set, flip-flop 65 applies a low potential over a line 66 to an "or gate" 67. The output of gate 67 is applied to cycle counter 43, which, in the present instance, is advanced when said output goes low. In order to time the advance of counter 43, that is, to synchronize it with the computer, the output Z of a coincidence gate 68 is also applied to "or gate" 67. This coincidence gate 68 has the C pulses from drum 28 applied to one grid, and the output of a flip-flop 70 applied to the other grid. Obviously, if flip-flop 70 is set appropriately, gate 68 applies a low potential to "or gate" 67 at C pulse time. The coincident application of low potentials by said gate 68 and by "go" flip-flop 65 effects a low potential at the input of counter 43 and the latter advances. Flip-flop 70 is set for the above purpose by a coincidence gate puller 71 to which the G pulses and the $Z_D$ pulses from drum 28 are applied. Referring to Fig. 2, it is evident that high potentials are simultaneously applied to both inputs of gate 71 during time period $t_{178}$ of each drum cycle and at no other times. This, of course, is due to the fact that the $Z_D$ pulse occurs only once per drum cycle and then during time period $t_{178}$. The flip-flop 70 is reset by a puller triode 72 to which the A pulses from drum 28 are applied, said A pulses, as shown in Fig. 2, occurring later in each time period than the C pulses.

Evidently, therefore, cycle counter 43 advances only on the occurrence of the C pulse during time period $t_{179}$ of each drum cycle on which "go" flip-flop 65 is set appropriately. Further, it is evident that the flip-flop 70 is reset by the A pulse which occurs immediately following the C pulse, so that the C pulses occurring during time periods $t_0$, $t_1$, etc. of the next cycle are ineffective to advance the counter.

The pulses which advance cycle counter 43 are also applied over output line 36 of Fig. 1 which, as shown in Fig. 3, includes a line 73 and an inverter 74, to the time period counter 34 to jump the latter to 255 and thus initiate an active cycle of operations. It is to be noted that said pulses occur during time periods $t_{179}$ at the same time as the C pulses which are used to advance counter 34 step by step, so that exactly one full time period elapses between the jumping of the counter to capacity and the advancing (or resetting) thereof to an initial "one" count during time period $t_0$. This complete time period is the same as time period $t_{179}$ but inasmuch as the counter stands at 255 for the duration thereof, the outputs of matrix 37 indicate that it is time period $t_{255}$. Thus, those outputs thereof which are utilized to control the computer during time periods $t_{179}$ are not effective and misoperations of the latter are prevented. Of course, counter 34, once it is jumped to 255 at the end of a drum cycle as just described, advances step by step under control of the C pulses until a count of 180 is attained during time period $t_{179}$ or $t_{255}$ of the next drum cycle.

The "go" flip-flop 65 is reset in time to prevent a second advance of cycle counter 43 during time period $t_{179}$ of the said next cycle by a coincidence gate puller 75 to which is applied a time pulse $t_{140}$ from matrix 37 and also the output of an inverter 76. Before describing the means which control the inverter 76, it is believed worthwhile to point out that this time pulse $t_{140}$ effects resetting of flip-flop 65 during time period $t_{140}$ of the active cycle following the cycle on which cycle counter 43 was advanced during time period $t_{255}$. Inverter 76 is controlled in its operation by a coincidence gate 77 which, as presently will appear, is maintained conductive, or operated, all during digit entering operations by flip-flops 78 and 80. Flip-flop 78 is set to apply a high potential to gate 77 by a coincidence gate puller 81 having one grid connected to the stage of cycle counter 43 appropriate to a one count and the other connected to the output of an inverter 82. Said inverter is connected by a line 83 with the positive side of the resistance 55 described above. Evidently, line 83 assumes a low potential whenever a key switch 53 is operated and a high potential at all other times. Therefore, inverter 82 produces a high output to condition gate 81 for operation during cycle one, whenever a key switch 53 is operated. Flip-flop 78 is reset by an inverter 84 which is connected through a resistance 85 to a source of negative potential, say −20 volts, and by a switch 86 to ground. Switch 86 may be operated in any desired manner. In the present instance, it is called the compute switch and is closed to apply ground potential to inverter 84 only when all keyboard operations have been completed and it is desired to set the computer itself into operation.

Flip-flop 80 which controls the other grid of Go circuit reset gate 77 is set to apply a high potential to said gate by a coincidence gate puller 87 to which an output from the stage of cycle counter 43 appropriate to a one count and a conductor 79 which, for the present, will be assumed to have a high potential, are applied. Flip-flop 80, therefore, is set on the occurrence of cycle one.

Flip-flop 80 is reset by a puller 88 which is driven by an inverter 90. The input of inverter 90 is connected through a differentiator circuit 91 to the blade of Store key 44, said blade normally being connected to the tap of voltage divider 54, but, on depression of the key, being connected to ground. The resistor of differentiator 91 is connected to a source of positive potential and inverter 90 is normally conductive. Operation of the Store key, therefore, applies a high potential to differentiator 91, but ineffectively as inverter 90 is already conductive. However, on release of the Store key, a negative potential is applied to the differentiator and the latter produces a sharp negative pulse which cuts off inverter 90 and puller 88 resets the flip-flop. Differentiator circuit 91 delivers only one effective pulse to inverter 90 following each Store key restoration. The operation of the Store key will be described more in detail hereinafter.

In view of the above description of the mode of operation of flip-flops 78 and 80, it is believed evident that the GO circuit reset gate 77 remains conditioned for operation by the $t_{140}$ time pulses, all during keyboard operations until such time as the Store key is operated.

*Decimal key and automatic decimal switch*

The function of the Decimal key 45 in the instant embodiment of the invention is to reset cycle counter 43 to its initial "one" count preparatory to the entry into the intermediate storage device of the decimal digits of a number. To this end, Decimal key 45 normally connects a conductor 92 (Fig. 3) of the line generally designated 48 in Fig. 1 with the negative potential tap of voltage divider 54, but, when operated, connects said line to ground potential. Line 92 is applied to a cathode follower 93 which, along with a second cathode follower 94, forms the heart of reset circuit 47 (Fig. 1) for cycle counter 43. The cathode followers are of conventional design and have a common output applied to counter 43.

Normally, the output of cathode follower 93 is low, due to the application thereto of a low potential from voltage divider 54. However, when key 45 is operated, a high (ground) potential is applied to cathode follower 93 and the latter produces a high output to reset the counter.

The function of the Decimal Selector switch 46 is to reset cycle counter 43 to its initial "one" count after a predetermined number of digits have been entered into intermediate storage device 26. In the present instance, switch 46 is settable to effect resetting of counter 43 after the first, second, . . . , fifth digits have been entered through keyboard 25. It will be understood, however, that switch 46 may have any desired capacity. Associated with switch 46 are a plurality of coincidence gates 95, one for each setting of the switch. One grid of each said gate is connected to a source of negative potential, say −20 volts, through a resistor 96, and also to a terminal of switch 46 whereby it is connectable to ground potential. Obviously, the gate having its one grid connected to ground potential by the switch is conditioned for operation by a high potential applied to its other grid, while the other gates are blocked from operation even though high potentials are applied to their other grids. The said other grids of the gates are connected to cycle counter 43 to have high potentials applied thereto individually during successive counts of the counter, beginning with a count of two which is attained following the entry of the first digit through keyboard 25.

Evidently, therefore, a setting of switch 46 conditions one of the gates 95 for operation and the latter is operated by a high potential from counter 43 after the appropriate number of digits have been entered through keyboard 25.

In order for an operation of any gate 95 to effect resetting of cycle counter 43, said gates have a common output (i. e., one voltage divider and its output line for all gates) which is applied to a plate connected type coincidence gate 97. Conduction of any gate 95, therefore, applies a low potential to gate 97. Assuming, for the present, that the other input to gate 97 is low, the same applies a high output potential to a coincidence gate 98. Also assuming, for the present, that the other input to gate 98 is high, the same applies a low output potential to one input of a plate connected type coincidence gate 101 through a time delay circuit 100. The output of gate 101 is applied to cathode follower 94, and, assuming that the second input of said gate also is low, the cathode follower is operated to reset cycle counter 43.

Neglecting, for the moment, the assumptions made above, it is evident that both Decimal key 45 and Decimal Selector switch 46 are operable to reset cycle counter 43 to its initial "one" count.

Decimal Selector switch 46 is not provided with a neutral position in which none of the gates 95 are conditioned for operation, although, if desired, such could be provided. Rather, the control circuitry associated with the switch is designed to take into account the absence of a neutral switch position.

The control circuitry associated with switch 46 must take the following factor into account. The switch controlled means must be disabled following each resetting of cycle counter 43 whether said resetting be under control of itself or the Decimal key 45, so that the counter will not be reset a second time erroneously. For exampple, if switch 46 is set at "5" and decimal key 45 is operated following the entry of the second digit through keyboard 25, the switch controlled means must be prevented from operating following the entry of the fifth decimal digit. Also, if switch 46 is set at, say "3," and the means controlled thereby are effective to reset counter 43 following the entry of the third digit, the same must be prevented from operating following the entry of the third decimal digit.

The control circuitry to the above and other ends includes the gates 97, 98, and 101 which were assumed to have the appropriate potentials applied to their second grids during the description of the means controlled by switch 46 for resetting cycle counter 43. Gate 97, to one grid of which the common output of gates 95 is applied, has an output from a flip-flop 102 applied to its other grid. This flip-flop is set to apply the desired low potential to gate 97 by a triode puller 103 which is connected with cycle counter 43 suchwise as to operate on the occurrence of cycle 12. Flip-flop 102 is reset to apply a high potential to gate 97 and thus to prevent resetting of the cycle counter under control of switch 46, by a triode puller 104 controlled by an "or gate" 105. Line 92 from Decimal key 45 is applied to one input of "or gate" 105 and on operation of the Decimal key the output of the gate assumes a high potential. This, of course, effects conduction of the inverter 104 and the latter resets the flip-flop.

Therefore, on operation of the Decimal key 45 the counter is reset as described hereinabove and gate 97 is disabled in order to prevent a second resetting of the cycle counter under control of the Decimal Selector switch 46. Gate 97 is re-enabled when flip-flop 102 is reset by an operation of puller 103 which takes place only after the Store key 44 is operated to shift the complete number from intermediate storage to drum 28, this being the only time at which the cycle counter 43 advances to twelve.

The other input of "or gate" 105, which resets flip-flop 102, is taken from the output of gate 101 which, it will be remembered, is high during the operation of resetting cycle counter 43 under control of switch 46. Obviously, therefore, gate 97 is also disabled following each operation of the Decimal Selection means.

Gate 101 which has the delay network 100 in its one input, has the other input connected to the output of gate 68, which output is indicated on the timing chart by the line Z. It will be remembered that the Z pulse which occurs once per drum revolution is the one which advances cycle counter 43 on appropriate drum revolutions. Gate 101, therefore, is conditioned (by the Z pulse) for operation at the same time that cycle counter 43 is being advanced. Delay circuit 100 is provided to ensure that when the counter advances to the count for which the Decimal Selector switch is set, the same would be reset immediately and the precession cycle of time period counter 34 appropriate to said count would not take place. The purpose of the delay circuit 100, therefore, is to delay the application to gate 101 of the low potential resulting from an operation of one of the Decimal Selector gates 95 until the Z pulse which advances the counter has passed. Gate 101 is operated on the occurrence of the Z pulse during the next drum revolution.

In some instances, keyboard 25 is utilized not only for entering numbers into the computer but also for entering multidigit numerical orders which do not contain a decimal point and which are handled differently by the intermediate storage device. Means to this end are disclosed in the copending application to W. Burkhart et al. #255,712. However, a knowledge of said means is not necessary to a complete understanding of the invention, it being sufficient to know that the means for resetting cycle counter 43 must not be operated by the decimal locating means when the keyboard is being utilized to enter orders into the computer.

Further, during the automatic operation of the computer which follows a series of keyboard operations, cycle counter 43 is utilized for timing purposes, and as the means for resetting the counter under control of the Decimal Selector switch act automatically when the counter reaches the count indicated by the setting of the switch, it is necessary to disable said means for computer operations.

To the above ends, a line, to which a high potential from any suitable source is applied when keyboard 25 is being used to enter orders, is applied to a plate connected type coincidence gate 106. Also applied to gate 106 is an output of flip-flop 78 which is low all during keyboard operations. Flip-flop 78, it will be remembered, is set to apply said low potential by a coincidence gate puller 81 during cycle one as indicated by cycle counter 43. Said flip-flop is reset to apply a high potential to gate 106 by the compute switch 86 which is operated only after the completion of all keyboard operations. The output of gate 106 is applied to the input of gate 98 which previously was assumed to be high during cycle counter resetting operations.

Evidently, therefore, a high potential is applied to said input of gate 98 all during keyboard number entering operations. However, if the compute switch 86 is operated or the keyboard is used for entering orders, a low potential is applied to said input and gate 98, and, therefore, the described cycle counter resetting means are disabled.

In order to reset cycle counter 43 to its intial "one" count each time the same has been advanced to twelve, an output of flip-flop 78, which is high except following an operation of compute switch 86, is applied to a coincidence gate 107. Also applied to gate 107 is an output of cycle counter 43 that assumes a high potential when the counter stands at a count indicative of cycle 12. The output of gate 107 is connected, in common with that of gate 98, to the delay circuit 100.

Evidently, therefore, regardless of the capacity of counter 43, the same is reset to an initial "one" count each time it attains a count of twelve during keyboard operations. Further, by including the compute switch controlled flip-flop 78 in the resetting arrangement, the full capacity of the counter, or any desired portion thereof, can be utilized during automatic computer operations.

*The store key*

Before describing the means associated with and the mode of operation of Store key 44, it is deemed desirable first to review briefly the operations leading up to a Store key operation.

First, the digit keys of keyboard 25 are manipulated to enter the digits to the left of the decimal point of a number into intermediate storage device 26, one by one, each during time periods $t_0$, $t_1$, $t_2$ and $t_3$ of a cycle initiated by the key operation. Between successive digit entries, recorded digits are precessed four time periods, so that if, for example, six digits are entered they are recorded during time periods $t_0, t_1, \ldots, t_{23}$ of the cycle initiated by the last key operation. Further, for each digit entry, the cycle counter 43 is advanced one step or count.

Following entry of the digits to the left of the decimal point, the Decimal key 45 is operated to reset cycle counter to "one." Of course, such resetting may take place automatically under control of the Decimal Selector switch 46, or, may be reset prematurely under control of the switch and then at the correct time under control of the key. In any event, the counter is reset to one preparatory to the entry of the digits to the right of the decimal point.

Next, the digit keys are operated to enter the decimal digits one at a time, each during time periods $t_0$, $t_1$, $t_2$ and $t_3$ of a cycle initiated by the key operation and recorded by counter 43. Again, recorded digits are precessed four time periods between successive key operations. For example, if six decimal digits are entered following the entry of six whole digits, the number (all twelve digits) is recorded during time periods $t_0, t_1, \ldots, t_{47}$ of the cycle initiated by the last decimal digit key operation. However, said number must be shifted in time to locate the decimal point thereof between time periods $t_{39}$ and $t_{40}$, this being the theoretical center of the twenty digit recording time $t_0$ to $t_{79}$ and the empirically set location for all decimal points. Obviously, a shift of four digit recording times or sixteen time periods is required to have the number recorded during time periods $t_{16}, t_{17}, \ldots, t_{63}$ with its decimal point correctly located. It is to be noted that cycle counter 43 is advanced six steps from its initial "one" count by the entry of the six decimal digits and stands at a count of seven. If now, the cycle counter is advanced to twelve and then reset to one, and the recorded digits are precessed four time periods for each advance step of the counter through a count of eleven, said digits are located correctly for transfer to the drum when the counter reaches a count of twelve. Obviously, the acts of advancing counter 43 to a fixed count regardless of what count it has attained in response to decimal digit entries, and of precessing the recorded digits four time periods for each step of said advance, effects a time shift of the recorded digits that always is equal in digit recording times, to said fixed count minus the count achieved in response to decimal digit entries. Thus, the decimal points of all recorded numbers are located at the same fixed time position when the number is shifted to general storage drum 28.

The means to the above ends are controlled by the Store key 44 (Figs. 1 and 3) and include an inverter 108 having its output joined with those of the inverters 60 described above. The input to inverter 108 is taken from the flip-flop 80 which, it will be remembered, is set to apply a high potential to the inverter by an operation of Store key 44 and is reset by puller 87 on the coincident occurrence of cycle one and a high potential on line 79. Line 79 is connected to the Decimal flip-flop 102 to have a high potential applied thereto when the latter is reset by puller 103 during cycle twelve. Therefore, when set set state. Therefore, gate 75 is prevented from resetting "go" flip-flop 65 while the Store key flip-flop 80 is in set condition, and cycle counter 43 is advanced through a series of steps while a series of precession cycles are taking place.

When cycle counter 43 advances through twelve and is reset to its initial count of one, flip-flop 80 is reset by puller 87 and gate puller 75 is enabled to reset "go" flip-flop 65. Thus cycle counter 43 does not advance beyond said one count and further precession cycles do not take place.

In the course of entering numbers into a computer or the like, some numbers containing no decimal digits will be encountered. In order to locate such numbers correctly in the intermediate storage device with the means described above, the Decimal key 45 must be operated following the entry of the last digit thereof, to reset cycle counter to one, and then the Store key must be operated to precess the recorded digits the appropriate amount. Of course, if the numbers of digits in said numbers are compatible with the capacity of Decimal Selector switch 46, the latter may be set to effect resetting of the cycle counter automatically, and Decimal key 45 need not be operated.

At this point it is deemed desirable to describe the manner in which the Decimal Selector switch is used to enter significant zeroes into the computer automatically. For example, it will be assumed that it is desired to enter the number 75,000 into the computer.

The Decimal Selector switch 46 is set to effect resetting of cycle counter 43 when the same reaches a count indicative of the entry of a fifth digit into storage device 26. Then the digit keys of keyboard 25 are manipulated to enter the digits 7 and 5. Following this, Store key 44 is operated to advance the cycle counter to twelve and to precess the recorded digits one digit space for each step of said advance. However, cycle counter 43 is reset to its initial one count when it reaches a count of six which indicates that five digits have been entered into storage device 26, i. e., two (7 and 5) by keyboard operation and three (zeroes) by precession of the former. Resetting of cycle counter 43 to its initial one count does not cancel the effect of the Store key operation however, due to the effect of line 79 described above, and the counter continues to advance until a count of twelve is achieved. Obviously this positions the number 75,000 correctly for transfer to general storage.

Figure 9:
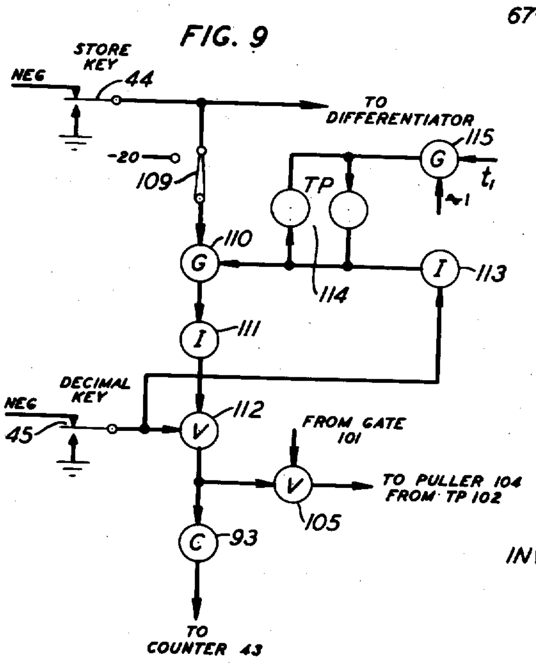

In order to eliminate the need for operating the decimal key following the entry of a number containing no decimal digits, regardless of the setting or the capacity of selector switch 46, the means shown in Fig. 9 may be provided. As shown, Store key 44 is In order to prevent conflict between the just described means and the operation of Decimal Selector switch 46 to obtain automatic zero entries, a switch 109 may be connected between Store key 44 and gate 110 to disable said just described means.

Evidently, therefore, the described means effectively eliminates the need for operating the Decimal key immediately prior to an operation of the Store key when entering numbers containing no decimal digits, or for utilizing the Decimal Selector switch for this purpose.

Figure 8:
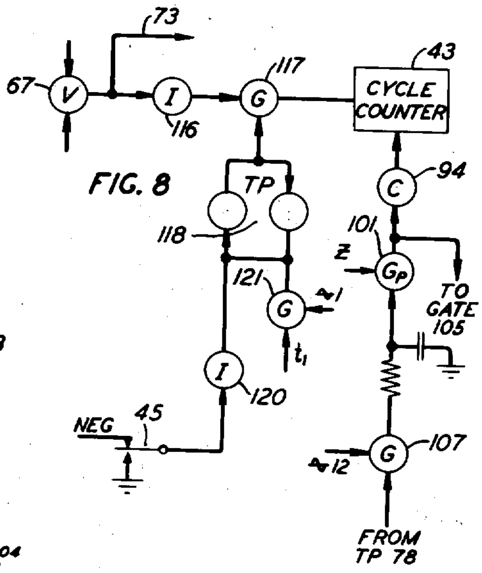
Fig. 8 is a fragmentary wiring diagram illustrating a simplification of the means of the invention, and, Fig. 9 is a fragmentary wiring diagram illustrating a further modification of the means of the invention.

Referring now to Fig. 8, there is illustrated a modified form of the invention which does not include the Decimal Selector switch and which operates on the hereinabove described principle of counting only the digits on one side of the decimal point as they are entered through the keyboard. As shown, an inverter 116 and a coincidence gate 117 are inserted between "or gate" 67 and cycle counter 43, to block transmittal to the latter of low impulses developed at the output of the former except when the gate is opened. Said gate is opened by setting a flip-flop 118 which is appropriately connected to the second input thereof and which has a triode puller 120 to effect setting thereof. Puller 120, in the present instance, is connected to the Decimal key 45 and is operated thereby. The flip-flop is reset to block gate 117 by a coincidence puller 121 which is operated at time period $t_1$ of cycle one following an operation of the Store key 44.

Evidently, therefore, gate 117 is effective to prevent pulses emanating from "or gate" 67 from advancing counter 43 until the Decimal key 45 has been operated, and only the entries of decimal digits are effective to advance the counter.

As indicated in Fig. 8, cathode follower 94 is utilized to reset cycle counter 43 when the latter reaches a count of twelve in response to a store key operation, the same as described hereinabove.

It is to be mentioned that, if desired, the arrangement shown in Fig. 9 for eliminating the need for the Decimal key when entering numbers containing no decimal digits may be applied to the modified means of the invention shown in Fig. 8. This application need not be described, however, as the manner of accomplishing the same will be apparent to anyone skilled in the art on reading of the preceding description.

It is to be mentioned that in some instances it may be desired to enter a number in reverse order, that is, starting from the lowest order decimal digit. For this mode of operation the means of the invention operates in the same manner as described above except that it is the counting of the digits to the left of the decimal point (after the decimal key has been operated) that effects correct positioning of the number in the storage device. This difference, of course, is immaterial to the devices involved.

It is also to be mentioned that the means of the invention is readily applicable to arrangements wherein all of the digits of a number are entered into storage (a shift register, for example) simultaneously with the lowest or highest order digit in a fixed location regardless of the number of digits involved, and with a signal or marker included at the appropriate location to indicate the decimal point. In this arrangement said marker or signal would automatically set the counter to a count representative of its location and, advancing the counter to the predetermined fixed count by an operation of the store or decimal locating key, would shift the number the appropriate number of digit positions.

While there have been above described but a limited number of embodiments of the invention, it is to be understood that many other modifications and changes can be made therein without departing from the spirit of the invention and it is not desired, therefore, to limit the scope of the invention except as pointed out in the appended claims or as dictated by the prior art.

We claim:

1. In a decimal point aligning arrangement for a computer or the like, the combination of a digit signal transmitting keyboard, a counter advanced one step for each decimal digit signal transmitted from the keyboard and arranged to count through a predetermined number of counts, a precessing storage device in which digit signals are recorded one at a time, recorded digits being precessed one digit signal space between successive digit signal transmittals, and key operated means for advancing said counter through the remainder of said predetermined number of counts after the last decimal digit entry and for precessing digit recordings one digit recording space for each step of such advance.

2. In a decimal point aligning arrangement for a computer or the like, the combination of a digit signal transmitting keyboard, a counter arranged to restore to an initial count after attaining a predetermined fixed count, a precessing storage device in which digit signals are recorded seriatim, a control circuit to effect a one-digit-space precession of recorded digits in response to each digital keyboard operation, and to advance said counter one step in response to each decimal digit keyboard operation, and key operated means to actuate said control circuit repetitively following entry of the last decimal digit, to advance said counter to said fixed count.

3. In a decimal point aligning arrangement for a computer or the like, the combination of a storage device in which digit signals are recorded seriatim, normally disabled means for precessing recorded digit signals a predetermined amount, enabled in conjunction with each new digit signal recording, a counter arranged to be reset to an initial count after attaining a predetermined fixed count, means to advance the counter one step for each new decimal digit signal recording, and decimal locating means actuated after the last decimal digit signal has been recorded to advance said counter step by step to said fixed count and to enable the precessing means at each step of said advance.

4. In a decimal point aligning arrangement for a computer or the like, the combination of a storage device in which representations of the digits of a number are recorded, their positions depending on the number of digits in the number, a counter adapted to count the digits on at least one side of the decimal point of the number and arranged to be reset to an initial count after attaining a predetermined fixed count, decimal locating means actuated to advance said counter to said fixed count from whatever count it attains in counting said digits, and means for shifting the representation of said number a digit position for each step of advance of said counter under control of said locating means.

5. In a decimal point aligning arrangement for a computer or the like, the combination of a storage device adapted to receive signals indicative of the digits of a number seriatim, normally disabled means for processing received signals one digit signal space, a counter arranged to be reset to an initial count after attaining a predetermined fixed count, a control circuit actuated in conjunction with the reception of each digit signal by the storage device and effective to enable said processing means and to advance said counter, decimal control means operable to reset the counter to said initial count prior to reception of the decimal digit signals by the storage device, and control means operable following reception of the last decimal digit signal to advance said counter to said fixed count and to enable said precessing means at each step of said advance.

6. The combination of a keyboard, coding gates associated with the keys of the keyboard and selectively conditioned for operation thereby, a signal producer actuated to produce a single signal by operation of any of said keys, a cyclically operable intermediate storage device, a cyclically operable general storage device synchronized with the intermediate storage device, means for transferring recorded signals from the intermediate to the general storage device, timing means synchronized with the storage devices for operating the conditioned gates during predetermined time periods of cycle, means for recording the signal outputs of said gates in said intermediate storage device during said predetermined time periods, each such recording representing one digit, a control circuit actuated by said signal producer, means enabled by said control circuit for precessing recorded signals one digit space for each actuation of the control circuit, a counter advanced by said control circuit one step for each actuation of the latter, and arranged to be reset to an initial count after attaining a predetermined fixed count, key operated means for resetting said counter preparatory to the operation of the keyboard to enter the decimal digits of a number, and key controlled means operable after entry of the last decimal digit to actuate said control circuit repetitively until said counter attains said fixed count.

7. The combination according to claim 6 wherein said control circuit includes a first trigger pair set by said signal producer, timed means for resetting said trigger pair to prevent more than one advance of said counter and more than one enabling of said precessing means, a second trigger pair, timed means for setting and resetting said second trigger pair on each cycle, and a gate controlled by both trigger pairs to produce an output to said counter and to said precessing means only when both are in set condition.

8. The combination according to claim 6 wherein the means for transferring signals stored in said intermediate storage device to said general storage device includes a gate to prevent said transfers except when said counter has attained said fixed count.

9. The combination according to claim 6 and including a connection for said decimal point locating means to reset said counter to its initial count preparatory to advancing the same to said fixed count if said decimal control means has not been operated, said connection including a gate, a trigger pair, timed means to set trigger pair to open the gate, and means actuated by the decimal control means to reset the trigger pair and close the gate.

10. The combination according to claim 6 and including settable means for automatically resetting said counter to said initial count after the same has attained a predetermined count.

11. The combination according to claim 6 and including settable means for automatically resetting said counter to said initial count after the same has attained a predetermined count, said means including a series of gates each representative of a particular number of digits, a selector switch settable to prepare a selected gate for operation, and connections from the several stages of the counter to said gates to operate the prepared one when the appropriate count is attained.

12. The combination according to claim 6 and including settable means for automatically resetting said counter to said initial count after the same has attained a predetermined count, and means for blocking operation of said settable means once the same or the key operated resetting means has been operated and before the said key controlled means has been operated.

13. The combination according to claim 6 and including settable means for automatically resetting said counter to said initial count after the same has attained a predetermined count, said settable means including a series of gates each representative of a particular number of digits, a selector switch settable to prepare a selected gate for operation, and connections from the several stages of the counter to said gates to operate the prepared one when the appropriate count is attained, and said blocking means including a gate through which the outputs of the switch gates are directed, a trigger pair set to close said gate on operation of the key operated resetting means or the settable means, and means to reset the trigger pair after the key controlled means is operated.

14. In a decimal point aligning arrangement for a computer or the like, the combination of a storage device in which digit signals are recorded seriatim, normally disabled means for precessing recorded digits a predetermined amount, enabled in conjunction with each new digit signal recording, a counter arranged to count through a predetermined number of counts, said counter being advanced one step for each digit on one side of the decimal point of the number of which the digits are a part, and means for advancing said counter through the remainder of said predetermined number of counts after the last digit on said one side of the decimal point has been entered and for precessing digit recordings one digit space for each step of said advance.

15. In a decimal point aligning arrangement for a computer or the like, the combination of a digit signal transmitting keyboard, a counter arranged to restore to an initial count after attaining a predetermined fixed count, a storage device in which digit signals are recorded seriatim, normally disabled means for precessing recorded signals a predetermined amount, enabled on transmission of each digit signal from the keyboard, means to advance said counter in response to each decimal digit entry, key operated means to control the counter to begin such advance from said initial count and key operated means for advancing said counter step by step to said fixed count at each operation thereof and for enabling the precessing means at each step of said advance.

16. The combination according to claim 15 wherein said key operated control means includes a gate normally closed to prevent advance of said counter in response to digit entries and a key operable to open the gate preparatory to the decimal digit entries.

17. The combination according to claim 15 wherein the means for advancing the counter in response to each decimal digit entry also advances the counter in response to the entry of each digit to the left of a decimal point and wherein said key operated control means resets the counter to said initial count preparatory to the decimal digit entries.

18. The combination according to claim 15 wherein said control means includes a gate normally closed to prevent advance of said counter, a trigger pair set to maintain the gate closed on resetting of the counter to said initial count, and a key operable to reset the trigger pair to maintain the gate open during decimal digit entries.

19. The combination according to claim 15 and including means settable to prepare said counter to count the decimal digits after a predetermined number of digits have been entered.

20. The combination according to claim 15 wherein said counter is also advanced in response to the entry of each digit to the left of a decimal point and wherein said key operated preparing means resets the counter to said initial count and including means settable to reset the counter automatically after the same has attained a predetermined count, said means including a series of gates, each representative of a particular number of entered digits, a selector switch to prepare the gates for operation selectively, and connections from the stages of the counter to the gates to operate the selected one thereof when the appropriate count is attained.

21. In a decimal point aligning arrangement for a computer or the like, the combination of a signal storage device, a control circuit, means for serially transmitting to said storage device signals indicative of the digits of a number and for actuating said control circuit for each digit signal transmitted, means enabled by said control circuit to precess stored digit signals one digit signal space for each control circuit actuation, a counter advanced by said control circuit, one step for each actuation of the latter and arranged to be reset to an initial count after attaining a predetermined fixed count, decimal control means for resetting the counter to said initial count preparatory to transmittal of the decimal digit signals of a number to said storage device, and decimal locating means operable following transmittal of the last decimal digit signal to actuate said control circuit repetitively until said counter attains said fixed count.

22. The combination according to claim 21 wherein said control circuit includes a first trigger pair set by said control circuit actuating means, a second trigger pair, timed means for setting and resetting said second trigger pair, a gate controlled by both trigger pairs to produce an output to advance said counter and to enable said precessing means only when both trigger pairs are in a predetermined condition, and means for resetting said first trigger pair to prevent a second control circuit output signal in response to a single actuation of said control circuit actuating means.

23. The combination according to claim 21 wherein said control circuit includes a first trigger pair set by said control circuit actuating means, a second trigger pair, timed means for setting and resetting said second trigger pair, a gate controlled by both trigger pairs to produce an output to advance said counter and to enable said precessing means only when both trigger pairs are in a predetermined condition, means for resetting said first trigger pair to prevent a second control circuit output signal in response to a single actuation of said control circuit actuating means, and means for blocking the last said resetting means including a gate and a trigger pair set to close the gate by an operation of said decimal locating means and reset to open the gate after said counter attains said fixed count.

24. The combination according to claim 21 wherein said signal transmitting and control circuit actuating means include a ten key keyboard, coding gates selectively conditioned for operation by keyboard operations, timed means synchronized with said storage device for operating said gates, and a signal producer for actuating said control circuit which is enabled to produce a signal on each keyboard operation.

25. The combination according to claim 21 wherein said signal transmitting and control circuit actuating means include a ten key keyboard, coding gates selectively conditioned for operation by keyboard operations, timed means synchronized with said storage device for operating said gates, and a signal producer for actuating said control circuit, which is enabled to produce a signal on each keyboard operation; wherein said decimal control means is operated by a decimal key on the keyboard and wherein said decimal locating means is also operable by a key on the keyboard.

26. The combination according to claim 21 wherein said decimal control means includes a key for operating the same manually at the appropriate time, and means settable to actuate the same automatically after a predetermined number of digits have been entered.

27. The combination according to claim 21 wherein said decimal control means includes a key for operating the same manually at the appropriate time, and means settable to actuate the same automatically after a predetermined number of digits have been entered, said means including a series of gates each representative of a particular number of digits, a selector switch settable to prepare a selected gate for operation, and connections from the several stages of the counter to said gates to operate the prepared one when the appropriate count is attained.

28. The combination according to claim 21 wherein said decimal control means includes a key for operating the same manually at the appropriate time, and means settable to actuate the same automatically after a predetermined number of digits have been entered, and including means for blocking operation of said settable means once the settable means or the key has been operated and before the decimal locating means has been operated.

29. The combination according to claim 21 wherein said decimal control means includes a key for operating the same manually at the appropriate time, and means settable to actuate the same automatically after a predetermined number of digits have been entered, and including means for blocking operation of said settable means once the settable means or the key has been operated and before the decimal locating means has been operated, said settable means including a series of gates each representative of a particular number of digits, a selector switch settable to prepare a selected gate for operation, and connections from the several stages of the counter to said gates to operate the prepared one when the appropriate count is attained, and said blocking means including a gate through which the outputs of the switch gates are directed, a trigger pair set to close said gate on operation of the key or the settable means, and means to reset the trigger pair after the decimal locating means is operated.

References Cited in the file of this patent

UNITED STATES PATENTS

| | | |
|---|---|---|
| 2,540,654 | Cohen | Feb. 6, 1951 |
| 2,549,071 | Dusek | Apr. 17, 1951 |
| 2,587,532 | Schmidt | Feb. 26, 1952 |
| 2,604,262 | Phelps | July 22, 1952 |
| 2,614,169 | Cohen | Oct. 14, 1952 |

OTHER REFERENCES

Proceedings of the National Electronics Conference, vol. III, "Storage of Numbers on Magnetic Tape," by J. M. Coombs (pages 201 to 209).

Investigations for the Design of Digital Calculating Machinery, Progress Report No. 2; pages II–5 to II–9; Distributed Computation Laboratory, Harvard Univ., November 10, 1948.